(12) United States Patent
Lee

(10) Patent No.: US 10,268,887 B2
(45) Date of Patent: Apr. 23, 2019

(54) APPARATUS AND METHOD FOR DETECTING EYES

(71) Applicant: HYUNDAI MOTOR COMPANY, Seoul (KR)

(72) Inventor: Seok Beom Lee, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 156 days.

(21) Appl. No.: 14/919,592

(22) Filed: Oct. 21, 2015

(65) Prior Publication Data

US 2016/0148050 A1    May 26, 2016

(30) Foreign Application Priority Data

Nov. 24, 2014  (KR) .................. 10-2014-0164377

(51) Int. Cl.
*G06K 9/00* (2006.01)
(52) U.S. Cl.
CPC ..... *G06K 9/00604* (2013.01); *G06K 9/00845* (2013.01)
(58) Field of Classification Search
CPC .................. G06K 9/00604; G06K 9/00845
See application file for complete search history.

(56) References Cited

U.S. PATENT DOCUMENTS

| | | | | |
|---|---|---|---|---|
| 5,621,457 A * | 4/1997 | Ishiwaka | ............ | G01C 21/3641 348/164 |
| 6,151,403 A * | 11/2000 | Luo | .................... | G06K 9/00597 382/117 |
| 7,646,422 B2 * | 1/2010 | Kisacanin | .............. | A61B 3/113 348/370 |
| 2002/0180756 A1 * | 12/2002 | Lee | ......................... | H04N 19/89 345/619 |
| 2002/0181774 A1 | 12/2002 | Ishikura | | |
| 2003/0174234 A1 | 9/2003 | Kondo et al. | | |
| 2006/0114328 A1 | 6/2006 | Kim et al. | | |
| 2006/0147094 A1 | 7/2006 | Yoo | | |
| 2007/0171292 A1 | 7/2007 | Kondo et al. | | |
| 2008/0267600 A1 | 10/2008 | Omi | | |
| 2014/0303853 A1 * | 10/2014 | Itoh | ........................ | B60R 11/04 701/49 |
| 2016/0081547 A1 * | 3/2016 | Gramatikov | ....... | G06K 9/00604 351/210 |

FOREIGN PATENT DOCUMENTS

| | | |
|---|---|---|
| JP | 08-159733 A | 6/1996 |
| JP | 2002-352229 A | 12/2002 |
| JP | 5045212 B2 | 10/2012 |
| KR | 10-2002-0023954 A | 3/2002 |
| KR | 10-2003-0077126 A | 10/2003 |
| KR | 10-2003-0077127 A | 10/2003 |
| KR | 10-2005-0025927 A | 3/2005 |
| KR | 10-0647298 B1 | 11/2006 |

* cited by examiner

*Primary Examiner* — Maria E Vazquez Colon
(74) *Attorney, Agent, or Firm* — Morgan Lewis & Bockius LLP

(57) ABSTRACT

An apparatus for detecting eyes comprises a camera configured to acquire an eye image using optical coding; and an image processor configured to perform signal processing on the eye image, wherein the signal processing comprises removing noise from the eye image caused by a glasses reflection point.

7 Claims, 4 Drawing Sheets

APPARATUS AND METHOD FOR DETECTING EYES

CROSS-REFERENCE TO RELATED APPLICATION

This application claims the benefit of priority to Korean Patent Application No. 10-2014-0164377, filed on Nov. 24, 2014 in the Korean Intellectual Property Office, the entirety of which is incorporated herein by reference.

TECHNICAL FIELD

The present disclosure relates to a technology for detecting eyes, and more particularly, to an apparatus and a method for detecting eyes capable of acquiring an eye image using optical coding so as to overcome eye obscuration due to light reflection from glasses when a user wears glasses and recovering the acquired eye image.

BACKGROUND

Generally, an advanced driver assistance apparatus serves to determine a driver's state and surrounding environment based on a camera, a radar, an ultrasonic sensor, and the like so as to assist a driver. An example of the advanced driver assistance apparatus may include a cruise control apparatus, a parking assistance apparatus, a lane change apparatus, a driver state monitoring apparatus, a collision alert apparatus, and the like.

Among those, the driver state monitoring apparatus may sense a pupil motion of a driver, a frequency of eye blink, a gaze direction, and the like using a camera to monitor drowsy driving and a forward gaze state of a driver. As such, when a driver's eyes are detected by the camera, to reduce an effect of sunlight incident on a vehicle and externally incident light such as a street light, a camera flash is operated. However, the camera flash may be reflected from glasses (or sunglasses) and thus may obscure the eyes (in particular, pupil and corneal reflection point), and as a result, it may be difficult to track a gaze and monitor a driver state.

Further, when the externally incident light is directly reflected from glasses, the externally incident light may obscure the eyes and thus it may be difficult to detect the eyes.

SUMMARY

The present disclosure has been made to solve the above-mentioned problems occurring in the prior art while maintaining intact advantages achieved by the prior art.

An aspect of the present disclosure provides an apparatus and a method for detecting eyes capable of acquiring an eye image using optical coding so as to overcome eye covering due to light reflection from glasses when a user wears the glasses and recovering the acquired eye image. According to an exemplary embodiment of the present disclosure, an apparatus for detecting eyes, comprises a camera configured to acquire an eye image using optical coding; and an image processor configured to perform signal processing on the eye image to remove noise from the eye image caused by a glasses reflection point.

The optical coding may be configured to blur the glasses reflection point.

The optical coding may use a fixed pattern filter.

The optical coding may use a micro mirror array.

The optical coding may use a difference in size of a corneal reflection and a glasses reflection.

According to an exemplary embodiment of the present disclosure, a method for detecting eyes comprises steps of setting an optical coding of a camera; acquiring an eye image using the optical coding; and performing signal processing on the eye image to remove noise due to a glasses reflection point.

The optical coding may be configured to blur the glasses reflection point.

The step of setting the optical coding may comprise using a fixed pattern filter.

The step of setting the optical coding may comprise using a micro mirror array.

The step of setting the optical coding may comprise using a difference in size of a corneal reflection and a glasses reflection.

The method according to claim 6, wherein in the step of performing signal processing comprises removing a blur due to the glasses reflection point from the eye image.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

In the present specification, unless explicitly described to the contrary, the terms "comprise", "configure", "have", and the like imply the inclusion of the corresponding components and therefore will be understood to imply the additional inclusion of other components rather than the exclusion of any other elements.

Further, the term "part", "-er, -or", "module", or the like, described in the specification means a unit of processing at least one function or operation and may be implemented by hardware or software or a combination of hardware and software. Further, unless mentioned in the present specification otherwise or clearly refuted by a context in a context describing the present disclosure, an article such as "a, an", "one", "the", or the like may be used as a meaning including both of a singular number and a plural number.

Hereinafter, exemplary embodiments of the present disclosure will be described with reference to the accompanying drawings.

The present disclosure uses optical coding to make a difference in blur for each distance using a difference in distance of an eye and a glasses reflection point and reduces a glasses reflection effect on the acquired image using an eye image recovery algorithm.

Figure 1:
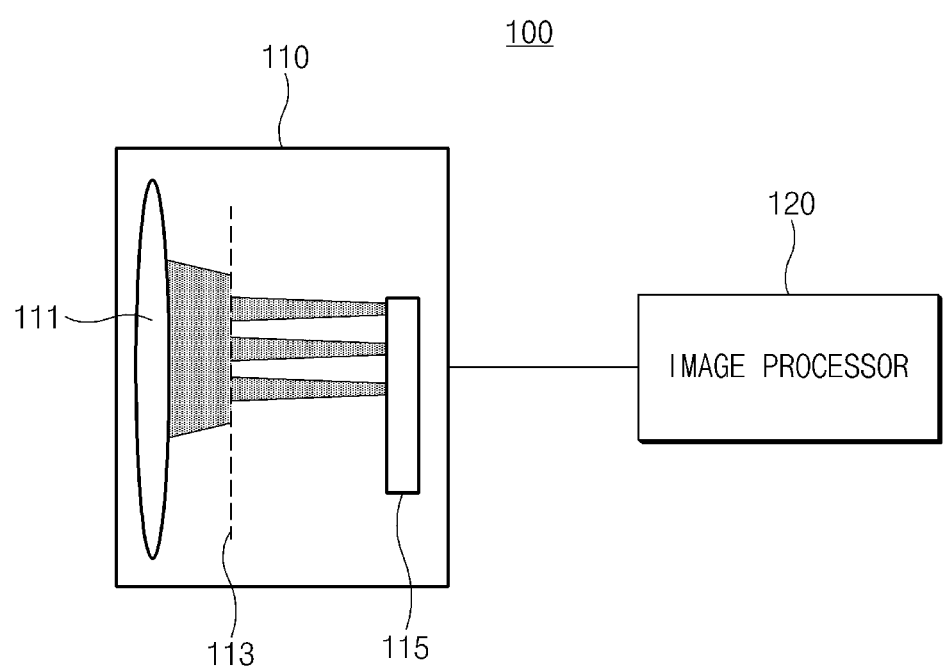
FIG. 1 is a block configuration diagram illustrating an apparatus for detecting eyes according to an exemplary embodiment of the present disclosure.

FIG. 1 is a block configuration diagram illustrating an apparatus for detecting eyes according to an exemplary embodiment of the present disclosure.

As illustrated in FIG. 1, the apparatus 100 for detecting eyes include a camera 110 and an image processor 120.

The camera 110 forms a subject image incident through a lens 111 on an image device 115. In this configuration, the image device 115 may be implemented as any one of image sensors such as a charge coupled device (CCD), an image sensor, a complementary metal oxide semiconductor (CMOS) image sensor, a charge priming device (CPD) image sensor, and a charge injection device (CID) image sensor.

An aperture 113 of the camera 110 serves to control a light quantity passing through the lens 111. Further, the aperture 113 may control a depth of field (DOF). According to an exemplary embodiment of the present disclosure, the aperture 113 is optically coded to adjust blur in response to a distance between an eye and a glasses reflection point. Here, the optical coding is controlled by a fixed pattern filter.

The camera 110 acquires an image blurred by the optical coding.

The image processor 120 acquires an eye image by optically coding the aperture 113 of the camera 110 when a user wears glasses or when an eye detection of the user may otherwise not be made. Further, the image processor 120 recovers the acquired eye image using an eye image recovery algorithm.

Figure 2:
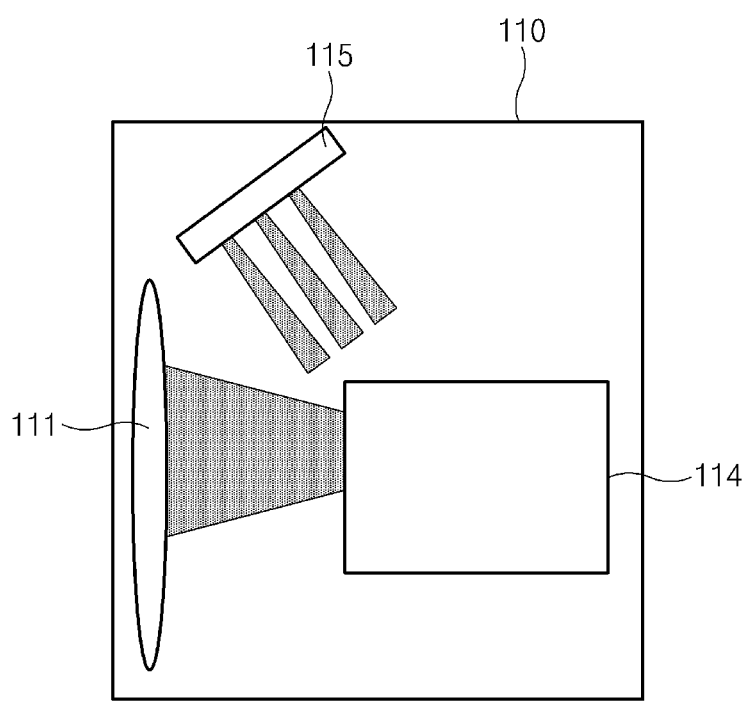
FIG. 2 is a diagram illustrating a structure of a camera according to another exemplary embodiment of the present disclosure.

FIG. 2 is a diagram illustrating a structure of the camera according to another exemplary embodiment of the present disclosure.

As illustrated in FIG. 2, the camera 110 includes the lens 111, a micro mirror array 114, and the image device 115.

The lens 111 is a transparent optical disc on which ambient light is incident and collects light to form a subject image.

The micro mirror array 114 serves as the aperture 113 which controls the depth of field. The apparatus 100 for detecting eyes controls the depth of field using the micro mirror array 114 to set the optical coding. The micro mirror array 114 blurs the glasses reflection point at the time of acquiring an image.

The image device 115 senses the light incident through the lens 111 to record the subject image. Here, the image device 115 is an image sensor in which devices sensing light such as the charge coupled device (CCD) and the complementary metal oxide semiconductor are integrated.

Figure 3:
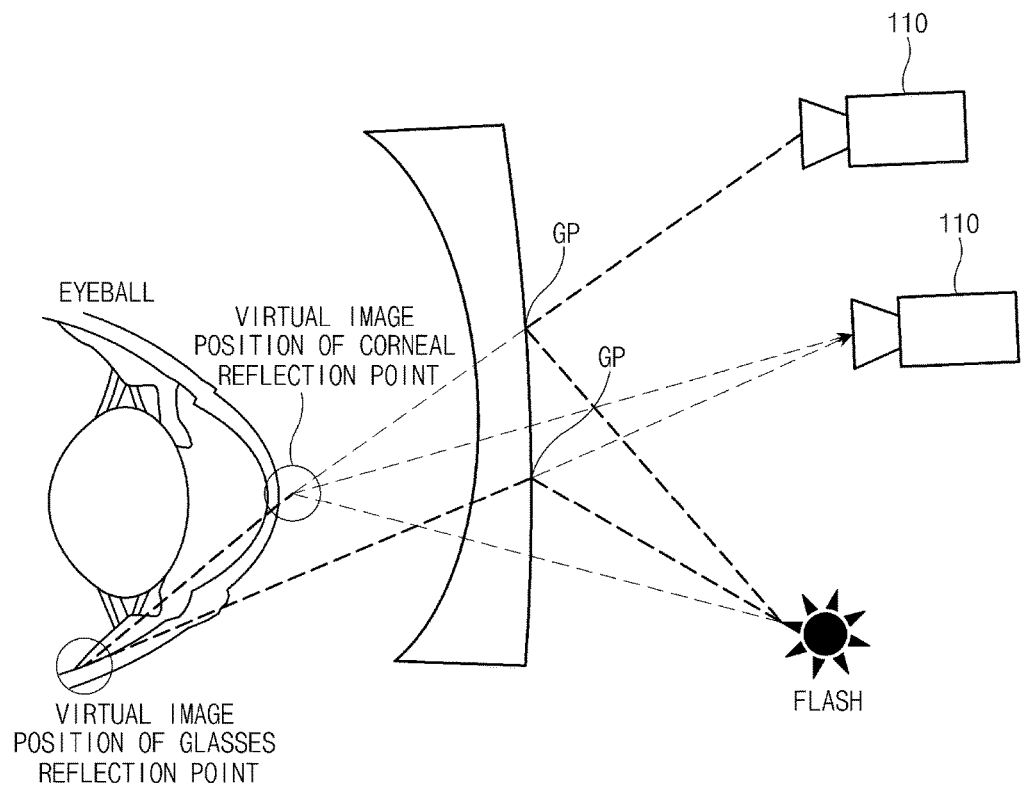
FIG. 3 is a diagram illustrating a relationship between an eye position and glasses reflection according to an exemplary embodiment of the present disclosure.

FIG. 3 is a diagram illustrating a relationship between an eye position and glasses reflection according to an exemplary embodiment of the present disclosure.

As illustrated in FIG. 3, even when a glasses reflection point GP is incident on the camera 110 while overlapping an eye, a virtual image position of the glasses reflection point is formed behind an eye by a curvature (generally, −3 to 3D) of glasses.

Therefore, the apparatus 100 for detecting eyes applies the optical coding to the aperture 113 of the camera 110 and increases the blur for the glasses reflection point by the optical coding. Further, the apparatus 100 for detecting eyes removes the blur of the eye image by signal processing of the image processor 120 and recovers the eye image covered with the glasses reflection point.

An image y acquired by the optical coding may be represented by the following [Equation 1].

$$y = f_g * u_g + f_e * u_e \quad \text{[Equation 1]}$$

In the above Equation 1, $f_g$ represents a point spread function (PSF) of the glasses reflection point, $f_e$ represents the PSF of an eye, $U_g$ represents the glasses reflection point (image), and Ue represents an eye (image).

To acquire the eye image, $f_{ec}$ convolutes to the above [Equation 1] and thus may be represented by the following [Equation 2].

$$u_{e_{hat}} = f_{ec} * f_g * u_g + u_e \quad \text{[Equation 2]}$$

In the above Equation 2, $f_{ec}$ represents a conjugate function of the eye and $u_{e_{hat}}$ represents a recovery image of the eye image.

In the above [Equation 2], the optical coding is set so that $f_{ec} \gg f_g$ and thus $u_{e_{hat}} \approx u_g$.

In the case of the glasses reflection, because "glasses curvature » corneal curvature", the light quantity incident on the aperture 113 of the camera 110 is even larger than that of the corneal reflection.

Further, the glasses reflection is directly reflected from an outer surface without passing through a glasses lens and therefore there is no light loss due to transmission. Therefore, there is a need to consider a difference in size of the corneal reflection and the glasses reflection at the time of determining the optical coding. The glasses reflection point and the eye are represented by the following [Equation 3] and [Equation 4].

$$u_g = A_g * R_g * I_g \quad \text{[Equation 3]}$$

In the above Equation 3, $A_g$ represents a size at which the glasses reflection point is formed on the aperture of the camera, $R_g$ represents reflectance of the glasses lens, and $I_g$ represents light incident on glasses.

$$u_e = A_g * T_g * R_c * T_R * I_e \quad \text{[Equation 4]}$$

In the above Equation 4, $A_e$ represents a size at which the corneal reflection point is formed on the aperture of the camera, $T_g$ represents transmittance of the glasses lens, $R_c$ represents the corneal reflectance, and $I_e$ represents light incident on an eye.

Arranging the [Equation 2] to [Equation 4], it may be arranged to the following [Equation 5].

$$f_{ec} * f_g * I_g < \frac{A_e * T_g * R_c * T_g}{(A_g * R_g) * I_e} \quad \text{[Equation 5]}$$

The optical coding needs to satisfy the above [Equation 5] and may be controlled by a fixed pattern filter or a micro mirror array.

Figure 4:
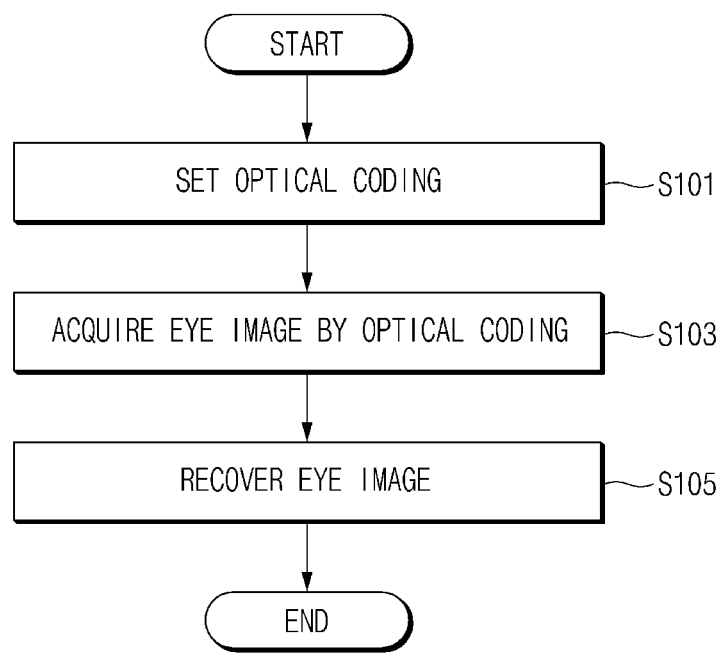
FIG. 4 is a flow chart illustrating a method for detecting eyes according to an exemplary embodiment of the present disclosure.

FIG. 4 is a flow chart illustrating a method for detecting eyes according to an exemplary embodiment of the present disclosure. The exemplary embodiment of the present disclosure is practiced when the user wears glasses or when the eye detection may not be made.

As illustrated in FIG. 4, the apparatus 100 for detecting eyes sets the optical coding of the camera 110 (S101). The apparatus 100 for detecting eyes applies an optical coding fixed pattern filter to the aperture 113 of the camera 110.

The apparatus 100 for detecting eyes acquires the eye image by the optical coding (S103). Here, the optical coding blurs the glasses reflection point at the time of photographing an image by the camera 110.

The apparatus 100 for detecting eyes recovers the eye image using the eye image recovery algorithm (S105). The image processor 120 removes the blur from the blurred eye image and therefore recovers the eye image covered with the glasses reflection point. That is, the image processor 120 removes the glasses reflection point from the image acquired by the camera 110 to detect the eye within the image.

As described above, according to the apparatus for detecting eyes in accordance with the exemplary embodiments of the present disclosure, it is possible to recover the eye image using the optical coding and the eye image recovery algorithm so as to overcome the eye covering due to the light reflection from the glasses when the user wears the glasses.

The above-mentioned exemplary embodiments are implemented by combining the components and the features of the present disclosure in a predetermined form. Each component or feature should be considered as being selective unless being explicitly described separately. Each component or feature may be practiced in a form in which it is not combined with other components or features. Further, the exemplary embodiments of the present disclosure may be configured by combining some components and/or features. An order of the operations described in the exemplary embodiments of the present disclosure may be changed. Some components or features of any of the exemplary embodiments may be included in other exemplary embodiments or may be replaced by the corresponding components or features of other exemplary embodiments. It is apparent that the exemplary embodiments may be configured by combining claims which do not have an explicitly cited relation in claims and may be included in new claims which are amended after filing.

The exemplary embodiments of the present disclosure may be implemented by, various means for example, hardware, firmware, software, or a combination thereof, or the like. In the case of the implementation by the hardware, the exemplary embodiments of the present disclosure may be implemented by one or more of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case of the implementation by the firmware or the software, the exemplary embodiments of the present disclosure may be implemented by a form of modules, procedures, functions, or the like, that perform functions or operations described above. Software codes are stored in a memory unit and may be driven by a processor. The memory unit is disposed inside or outside the processor and may transmit and receive data to and from the processor by the well-known various means.

It is apparent to those skilled in the art that the exemplary embodiments of the present disclosure may be embodied in other specific forms without departing from features of the present disclosure. Therefore, the foregoing detailed description is not to be restrictively construed in all aspects but should be reckoned as being exemplary. The scope of the present disclosure is to be determined by a reasonable interpretation of the appending claims and all the changes within a equivalent range of the present disclosure are included in the scope of the present disclosure.

What is claimed is:

1. An apparatus for detecting eyes, comprising:
a camera acquiring an eye image, and to blur a glasses reflection point; and
an image processor performing signal processing on the eye image to remove the blurred glasses reflection point from the eye image,
wherein the camera adjusts blur in response to a distance between an eye and the glasses reflection point, and
the glasses reflection point is blurred by a micro mirror array.

2. The apparatus according to claim 1, wherein the camera includes a fixed pattern filter applied to an aperture of the camera.

3. The apparatus according to claim 1, wherein the camera blurs using a difference in size of a corneal reflection and a glasses reflection.

4. A method for detecting eyes, comprising steps of:
acquiring an eye image using a camera;
blurring a glasses reflection point; and
performing signal processing on the eye image to remove the blurred glasses reflection point from the eye image,
wherein the camera adjusts blur in response to a distance between an eye and the glasses reflection point, and
wherein the step of blurring the glasses reflection point comprises using a micro mirror array.

5. The method according to claim 4, wherein the step of blurring the glasses reflection point comprises using a fixed pattern filter applied to an aperture of the camera.

6. The method according to claim 4, wherein the step of blurring the glasses reflection point comprises using a difference in size of a corneal reflection and a glasses reflection.

7. The method according to claim 4, wherein in the step of performing signal processing comprises removing a blur due to the glasses reflection point from the eye image.

* * * * *